United States Patent [19]

Sebastiano et al.

[11] Patent Number: 4,997,715
[45] Date of Patent: Mar. 5, 1991

[54] PROCESS FOR THE PRODUCTION OF A SAFETY GLASS AND THE PRODUCT THEREBY OBTAINED

[75] Inventors: Francesco Sebastiano, Termoli CB; Luigi Capriotti, San Benedetto del Tronto AP, both of Italy

[73] Assignee: Societa' Italiana Vetro - SIV - S.p.A., San Salvo CH, Italy

[21] Appl. No.: 433,774

[22] Filed: Nov. 9, 1989

[30] Foreign Application Priority Data

Nov. 9, 1988 [IT] Italy ................. 48539 A/88

[51] Int. Cl.$^5$ ............................................ B32B 17/10
[52] U.S. Cl. ..................................... 428/410; 156/99; 156/102; 156/245; 428/430
[58] Field of Search ...................... 156/99, 102, 245; 428/409, 410, 430

[56] References Cited

U.S. PATENT DOCUMENTS 4,227,950 10/1980 Spycher ................. 156/102 X
4,632,877 12/1986 Watanabe et al. ............ 428/409

FOREIGN PATENT DOCUMENTS 233519 8/1987 European Pat. Off.

Primary Examiner—Robert A. Dawson
Attorney, Agent, or Firm—Wenderoth, Lind & Ponack

[57] ABSTRACT

A process for the production of a safety glass for instance for cars or buildings, said glass being made of a sheet of glass and a sheet of plastic material, through press forming on said glass sheet of a composition having a urethanic/acrylic/vinylic base.

6 Claims, No Drawings

PROCESS FOR THE PRODUCTION OF A SAFETY GLASS AND THE PRODUCT THEREBY OBTAINED

BACKGROUND OF THE INVENTION

1. Field of the Invention

The present invention relates to a process for the production of a safety glass and the product thereby obtained.

2. Description of the Prior Art

The production and the use of safety glasses already belongs to the state of the art; among the safety glasses, the so-called laminated glasses have proved to be particularly advantageous, especially for use in the automobile and building industries. In said laminated glasses a film of transparent plastic material is laminated between two sheets of glass which are coupled through the action of heat and pressure.

The impact breakage of such a laminated safety glass produces no splinters. Of course, in addition to the safety requirements, said glass must also meet optical and mechanical standards. This glass must show a light transmission not lower than the light transmission of glass and, in any case, within values fixed by specific rules for the light transmission of windscreens, especially when the safety glass is used as a windscreen for cars. Moreover, it has to show high resistance to scratching and maintain constant over time its transparency, that is it must not turn yellow; the yellowing was in fact a drawback of the polyvinylacetates, polystyrenes and acetyl celluloses used in processes belonging to the state of the art.

In the present commercial trends to reduce the weight of the glasses used the double layer glasses are to be considered; so-called because they are formed of a layer of glass and of a layer of plastic material; such a layer of plastic material must show precise mechanical, physical and optical properties, for instance antitearing, self-healing properties, resistance to abrasion, resistance to hydrolysis and resistance to aging and a light transmission not lower than the light transmission of glass. The processes of production must obviously guarantee that the finished product shows all the required properties. The use in double layer glasses of plastic materials obtained through polymerization of monomers of various origin using IPN techniques (interpenetrating polymer networks) already belongs to the state of the art.

Following these techniques, appreciable improvements in the properties of the finished product have been obtained, chaining together the polymers, notwithstanding the fact that most of the polymers of different origin show an extremely limited mutual compatibility. Moreover, a process for the production of double layer glasses already belongs to the state of the art (Italian patent application number 19459A/86 filed on Feb. 19, 1986 by the same Applicant and corresponding to European patent application 87101208, publication No. 0233519) in which a particular composition essentially based on urethanic, acrylic and vinylic monomers, which can be polymerized in situ following the IPN technique, is applied through spraying and/or glazing on the glass substrate. Said glass substrate is kept in rotation at a fixed speed in order to obtain a uniform thickness of the applied composition and same composition is exposed to the action of ultraviolet and infrared radiations in order to initiate the polymerization of the monomers which will form the plastic coating. Using this process it is, however, difficult to obtain plastic coating thicknesses near to 1000 $\mu$m, which are necessary to confer to the double layer composite a sufficient mechanical strength. Moreover, following the described technique, a thickness near to 1000 $\mu$m can be reached by carrying out a great number of applications of the composition, which in turn is detrimental to the optical quality of the same coating. It is not possible to make a single application because the polymerization of at least two of the base components is usually initiated by UV radiation, and the problems of using these radiation to induce a complete and homogeneous polymerization in thicknesses such as the one considered in the present case are well known.

SUMMARY OF THE INVENTION

It has now been surprisingly found that by press forming on the internal surface of a glass a particular urethanic/acrylic/vinylic composition which can be polymerized in situ using the IPN technique, it is possible to overcome the above indicated drawbacks; in this way not only the maintenance of the optical quality of said coating even to thicknesses greater than 400 $\mu$m can be obtained, but also in the case of thicknesses of 1000–1500 $\mu$m, a mechanical strength sufficient to meet the legal requirements.

The subject of the present invention is therefore a process for the production of a safety glass made of a glass sheet and of a layer of plastic material, characterized by the fact of comprising the following operations:

(a) preparation of a composition which can be polymerized and pressed, comprising in addition to urethanic, acrylic and vinylic monomers, which can be polymerized in situ using the IPN technique, also 0.4–1.5% by weight, with reference to the total weight of said monomers, of a catalytic system made of an activator selected from the class consisting of mono- or diarylic ketones and of at least a further activator selected from the class for example consisting of azocompounds and organic peroxides;

(b) press-forming on said glass sheet and polymerization of a layer of said composition, using as a male mould male mould made of a material selected from the class formed by glass, Teflon and metals and as a female mould said glass sheet; and (c) release of the safety glass thus obtained from the male mould and afterbake in oven, whereby a glass having a layer of plastic material with a thickness greater than 400 $\mu$m with optical properties not lower than those of the glass is obtained.

The surface of the male mould which is to be released from the press-formed plastic coating, must be treated with a release agent in order to facilitate the separation. The use of monomolecular layers of a release agent selected according to the kind of material used as a male mould has been found as particularly advantageous, so that the adhesiveness of the mould surface decreases, without however causing modifications of the coated layer of plastic material.

The use of a glass mould in the process according to the present invention has proved to be particularly advantageous thanks to the properties of surface finishing of glass and moreover to its properties of poor adhesion to polymers.

When using metals as the material for the male mould in the process according to the present invention, the use of carbon steel polished to a mirror surface and coated with a chromium layer in its turn polished, has been found particularly advantageous. The mould must be also treated with a release agent which does not leave any print.

The press forming can be carried out according to various methods. In the following the three main methods are listed, with reference to glass mould, even though it will of course be possible to build moulds in other materials also.

(A) Horizontal Pressing

On the concavity of the receiving glass (female mould) a quantity of material exceeding the quantity to be used is poured, during a period of from ten seconds to two minutes. A glass male mould, pre-treated with a release agent is anchored to a metallic holder. The male mould is brought to the female mould with a slow movement to aid the flow of the material to a stop (gasket) which keeps the two sheets of glass separate by an amount equal to the thickness to be obtained; the male mould remains in this position for a period of between twenty seconds and four minutes. In advanced polymerization (5–15 minutes) the male mould rises up slowly and it is possible to extract the glass with its coating. Another embodiment of this method is the removal of the whole male mould glass/plastic material/female mould glass package from the casting zone and immediate feeding to another baking zone leaving the casting zone free for another series of glasses.

Moreover, it has been shown to be advantageous to treat the internal face of the female mould glass with an adhesion promoter or bridging agent in order to aid the adhesion of the plastic coating. Silanic based promoters, titanates and zirconium-methacrylates have been advantageously used.

(B) Horizontal pressing with closed die

The method of proceeding is similar to that above referred, in this case however the two glasses are already placed together so that a hollow space of about 1000 μm is formed. In this hollow space the plastic coating is injected at a low pressure allowing the air to leave through another hole. When the injection is almost finished the outlet hole of the air is closed so that a slight pressure (1.5–2 Ata) is created inside. After 5–15 minutes release is performed.

(C) Vertical Pressing

This kind of pressing can be realized both in multiple dies where each single glass is both male mould and female mould, and also with a single couple of glasses so that a cell is formed. The material is cast into this cell and left for 5–15 minutes at 70°–90° C. The cells are opened by heating the male mould glass up to 130° C. for a short period and slowly separating the female mould glass with the coating. A further embodiment is the possibility of bringing slowly together the male mould glass and the female mould glass, thus helping the removal of the air.

Using the pressing methods above referred it is possible to build with the same plastic material and at the same time a gasket on the edge of the glass which makes possible the anchorage of the same glass to the body of a car or to an architectural building element. All the press forming methods have in common the operation of afterbaking in oven to a temperature of 60°–100° C. for a period of 1–5 hours. Through the afterbake the plastic coating polymerization is completed.

The admixture used in the process according to the present invention is a composition based on urethanic, acrylic and vinylic monomers which can be polymerized in situ with the IPN technique; a catalytic system has been added to the same composition in consideration of the specific requirements of the process. As a matter of fact, the formation of the coating layer in plastic material takes place through the independent polymerization of the urethanic and acrylo-vinylic components of the composition (IPN). As already stated, one of the difficulties of the UV initiated polymerization is the penetration of the radiation inside the coating at thicknesses greater than 400 μm. At these thicknesses and in the case of attenuated UV transmissions, for instance through a glass wall, phenomena of incomplete polymerization can take place. Moreover, it would be difficult during the pressing operation to further initiate the UV polymerization through the dies. Therefore, according to the process of the present invention, the catalytic system used also comprises a catalyst which can develop active radicals under mild heating and therefore make the polymerization go on without further exposure to ultraviolet radiation, at least as far as the acrylo-vinylic component is concerned, in view of the fact that the polymerization of the urethanic component is already catalyzed by IR catalysts of organometallic type. In this connection it is to be stressed that the initiation of the polymerization reaction of the acrylo-vinylic component through UV radiation, emitted by low power lamps and the following IR catalysis without further UV stresses, produce finished products which surprisingly show improved mechanical properties.

Among the IR catalysts for the acrylo-vinylic component azocompounds and organic peroxides have been shown to be particularly advantageous, among IR catalysts for the urethanic component mercury salts and organometallic compounds, particularly containing lithium and tin, have been shown to be particularly advantageous and among the UV catalysts for the acrylo-vinylic component, monoaryl ketones such as 1-(4-isopropylphenyl)-2-hydroxy-2-methylpropan-1-one, 2-hydroxy-2-methyl-1-phenyl-propan-1-one, etc., and diaryl ketones such a bensoin-isobutylether, 1,2-diphenyl-2,2-dimethoxy-ethanone, etc., have shown themselves to be particularly advantageous.

From the pressing practice another necessity is that the plastic coating also contains in its composition a material which can facilitate the removal from the inside of the pressed workpiece (so-called internal release agent) which migrates towards the surface during the polymerization and comes between the male mould and the coating material, thereby facilitating the removal (SILWET 7001- 7002, BIK 370 etc.).

It is again to be stressed that the product obtained according to the process of the present invention is characterized by a very high optical quality which derives on the one hand from the kind of coating composition used, and on the other hand from the kind of working through pressing.

EXAMPLES

Example 1

9.5 g of a difunctional polyether (PTHF) having a molecular weight of between 250 and 350; 4.6 g of a trifunctional polycaprolactone having a number of OH equal to 303.5; 120 g of a difunctional polycaprolactone having a molecular weight of about 1000 (Capa 214); 250 g of a polyether admixture having an average molecular weight of about 800 and functionality 2.4 (Lab. A2499 -Hils); 215 g of a tetrafunctional polycaprolactone (Capa 316); 260 g of polytetrahydrofuran 1000 having a functionality of 2; 40 g of a plasticizer having low volatility and hygroscopicity (for example DOP, DIBP, TBP, DPB, BBP etc.), are mixed together in a reaction flask. This reaction mass is heated at about 100° C. and stirred under vacuum for 1–4 hours. After cooling at 40°–60° C. from 150 to 300 g of N-vinylpyrrolidone; from 100 to 300 g of 2-ethylhexylacrylate; from 1 to 50 g of trimethylolpropane-triacrylate; from 1 to 50 g of a medium-high boiling solvent (DOWANOL, OXITOL, PROXITOL etc. and others, for examples acetates); 3–9 g of a catalyst of mercury (TORCAT); 0.6–1.8 g of DBTL (dibutyldilauryl tin); from 2 to 6 g of a UV stabilizer which does not interfere with the actinic initiation of the reaction; 0.2–1 g of an azocompound; 0.5–1.5 g of DAROCUR 1173; 2.3 g of a silicone agent for the equalization of the shrinkages and as an internal release agent (SILWET 7002) are added. The admixture is left under atmospheric pressure under agitation for 1–2 hours obtaining, under usual stocking conditions (25° C. in sealed containers) a mix showing a stability higher than 6 months. A quantity of an admixture of isophoronediisocyanate (IPDI) difunctional (94%) and trifunctional (6%) so that an excess of —NCO groups over —OH groups available varying from 2 to 7% is present, is added immediately before use to the mix. The mix has a time of workability of about 10 minutes at 25° C. with an initial viscosity of 60 cps. The mix is initially exposed to UV radiation emitted by low power lamps and maintained during the pressing at a temperature between 30 and 90° C. The pressing is carried out using a male mould made of glass with high content in alumina and chemical hardening. Analysis carried out on the polymerized and "seasoned" material show very good behavior in mechanical tests:

ultimate tensile strength: 25 N/mm$^2$
elongation at ultimate tensile strength: >250%

Also after artificial ageing carried out for 2500 hours with an apparatus commercially indicated Weather-o-meter of the type Q PANEL, no appreciable variations of the mechanical properties are observed.

Example 2

7.5 g of PTHF300, 36 g of Capa 304, 61 g of Capa 214, 250 g of polyether mixture such as Lab. A2499, 215 g of Capa 316, 210 g of PTHF 1000 are taken and mixed at 100° C. under vacuum (residue 15 mm/Hg) for about 4 hours. From 10 to 50 g of DOP, from 50 to 250 g of NVP, from 50 to 300 g of isobornylacrylate, from 5 to 50 g of TMPTA, from 1 to 50 g of monoethyl ether of ethyleneglycolacetate, from 1 to 5 g of TORCAT, from 0.6 to 2 g of DBTL, from 2 to 6 g of TINUVIN 765, from 0.2 to 1.5 g of azodiisobutyronitrile, from 1 to 3 g of SILWET 7002 are added.

After homogeneization a suitable quantity of a mixture of di- and trifunctional IPDI are added to the mix and same is quickly homogenized without absorbing air. The mix so obtained can be used with the above referred systems for the production of a strong and transparent coating.

Example 3

410 g of a trifunctional polycaprolactone having a molecular weight of 540, 1213 g of a polytetrahydrofuran having a molecular weight of 300 and functionality 2, 1570 g of a polycaprolactone having a molecular weight of 550 and functionality 2, 1520 g of a polyether admixture such as Lab. A2499, 900 g of a difunctional polytetrahydrofuran having a molecular weight of 1000 and 9 g of a deaerating agent such as SILWET L77 are taken. Such materials are heated under agitation and under vacuum for 1–2 hours, then after cooling at 50° C. from 500 to 1000 g of DOP, from 100 to 450 g of an acrylic mono- or difunctional monomer selected among 2-ethylhexylacrylate, 1,4-butanedioldiacrylate, NPGDA (neopentylglycol diacrylate), TPGDA (tripropylenglycoldiacrylate), IBA (isobornylacrylate), etc., from 100 to 300 g of a multifunctional acrylic monomer (e.g. TMPTA, PETTA, ethoxylate TMPTA, etc.), from 100 to 800 g of a vinylic monomer of the NVP kind, from 1 to 3 g of an azocompound or of an organic peroxid and from 1 to 3 g of a silicone agent such as DC193 are added. The mix is left under agitation for about 1 hour at room temperature. Just before use a suitable quantity of a ditrifunctional mixture of IPDI is added, so that an excess of NCO groups in comparison with OH groups is created.

The product obtained according to the process of the present invention, coupling a sheet of glass with a plastic coating according to the composition already indicated, shows not only very good properties of light transmission but also remarkable properties in absorbing impacts, particularly in the case of windscreens, both in the case of impacts coming from the inside and in the case of impacts coming from the outside. Laboratory tests show that a safety glass of 5.5 mm thickness with a plastic coating such as that referred to above, can withstand two strokes in the same point from a steel ball weighing 2300 g, released from a height of 4 m.

We claim:

1. A process for the production of a safety glass formed by a glass sheet and a layer of plastic material obtained by coating said glass sheet with a composition in a substantially liquid state, consisting essentially of urethanic, acrylic and vinylic monomers to be polymerized in situ with the IPN technique comprising:
    (a) providing said composition in a substantially liquid state, said composition being capable of being polymerized and further including therein a catalytic system consisting of an activator selected from the group consisting of mono- and diaryl ketones and at least a further activator selected from the group consisting of azo compounds and organic peroxides, in an amount of 0.4–1.5% by weight with reference to the total weight of said monomers;
    (b) press-forming said composition on said glass sheet in order to obtain after polymerization said layer of plastic material using a male mould made of a material selected from the group consisting of glass, polytetrafluoroethylene and metals, and as a female mould said glass sheet, said press forming being carried out at a temperature between 30 and 90° C. and for 5–10 minutes; and
    (c) removing the safety glass so formed from said male mould and afterbaking said safety glass in an oven,
    whereby a glass having a thickness of said completely polymerized plastic material layer greater than 400 μm, which shows optical properties not lower than those of glass, is obtained.

2. Process according to claim 1, wherein, during said operation of press-forming, a male mould made of glass with a high content in alumina and chemical hardening is used.

3. Safety glass obtained from the process as claimed according to claim 1, wherein the thickness of the layer of plastic material coating is comprised between 1000 and 1500 μm with optical properties not lower than those of glass.

4. Glass according to claim 3, having a gasket on the edge made with the same plastic material used for the coating layer.

5. An automotive windshield made of the glass according to claim 3.

6. An automotive windshield made of the glass according to claim 4.

* * * * *